United States Patent [19]
Smith, III

[11] Patent Number: 5,015,016
[45] Date of Patent: May 14, 1991

[54] INTERNAL PRESSURE LOADED V-SEAL CONNECTOR

[75] Inventor: Robert E. Smith, III, Stafford, Tex.

[73] Assignee: National Coupling Company, Inc., Stafford, Tex.

[21] Appl. No.: 332,545

[22] Filed: Apr. 3, 1989

[51] Int. Cl.$^5$ ............................................. F16L 29/00
[52] U.S. Cl. ................................... 285/108; 277/27; 137/614.04
[58] Field of Search ..................... 277/27, 206 R, 181; 285/108, 110, 111, 112; 137/614.04

[56] References Cited

U.S. PATENT DOCUMENTS

| | | | |
|---|---|---|---|
| 2,129,704 | 9/1938 | Meyer | 285/110 X |
| 4,589,689 | 5/1986 | Regan | 285/108 X |
| 4,637,470 | 1/1987 | Weathers et al. | 137/614.04 X |
| 4,709,726 | 12/1987 | Fitzgibbons | 137/614.04 |

Primary Examiner—John C. Fox
Attorney, Agent, or Firm—Arnold, White & Durkee

[57] ABSTRACT

A coupling having an internal pressure-loaded V-seal between a male member and a female member incudes a sleeve member insertable into the female member bore. The V-seal is repeatably positionable in the sleeve member such that insertion of the male member serves to slightly compress the V-seal and thereby preload the seal before pressurization. Upon pressurization of the coupling, the lips of the V-seal are urged to expand longitudinally against the leading face of the male member and an internal shoulder in the sleeve member. The pressurization of the coupling also tends to urge the sleeve member toward the male member, to enhance the seal and to compensate for any tolerances between the coupling halves.

9 Claims, 3 Drawing Sheets

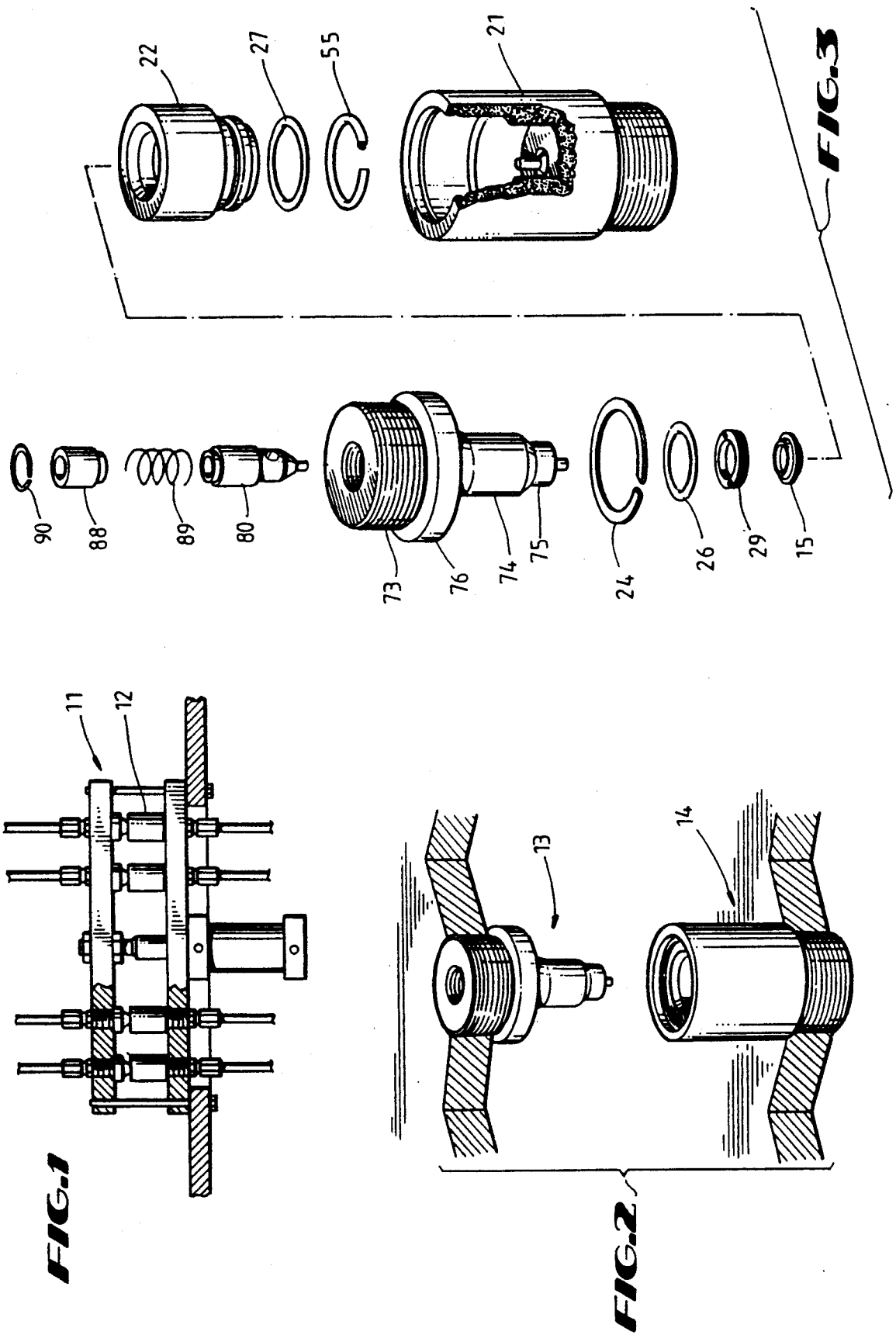

INTERNAL PRESSURE LOADED V-SEAL CONNECTOR

FIELD OF THE INVENTION

The present invention pertains to couplings and, more specifically, to hydraulic couplings in which a metal-to-metal seal is used between the male and female members.

BACKGROUND OF THE INVENTION

Subsea hydraulic couplings are old in the art. The couplings generally consist of a male and female member with seals positioned within the female member to seal the junction between the male and female members.

The female member is generally a cylindrical body with a relatively large diameter longitudinal bore at one end and a relatively small diameter longitudinal bore at the other. The small bore facilitates connections to hydraulic lines, while the large bore contains the seals and receives the male portion of the coupling. The male member includes a cylindrical portion at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the seals, generally resembling O-rings, either abut the end, or face, of the male member or engage the male member about its circumference. The hydraulic fluid is then free to flow through the female and male portions of the coupling, and the seals prevent that flow from escaping about the joints in the coupling.

In some instances a check-valve may be installed in the female member and also in the male member. Each check-valve is opened when the coupling is made up, and each check valve closes when the coupling is broken so as to prevent fluid from leaking out of the system.

The seals most commonly used in the past have been an elastomeric material and such seals have numerous disadvantages. The principal disadvantages are: (1) the inability of the seal to withstand the deteriorating effects of a subsea environment for extended periods of time, and (2) the inability of the soft seal to contain the higher pressures being imposed on the hydraulic systems.

Metal seals have been developed to better withstand both the deteriorating effects of the environment and higher pressures. One such seal is a crush type which is positioned between the end of the male portion of the coupling and the internal end of the large bore in the female portion. When the male portion is inserted into the female, the metal seal is crushed between the two portions and a seal is effectuated between the two. In view of the crushing action, the seal can be used only once. If the coupling is separated for any reason, the once used crushed seal must be replaced with a new seal. Also, the male and female members must remain fully engaged to prevent leakage around the seal.

Another type of metal seal has been employed for sealing between the end face of the male member and a shoulder in the bore of the female member. The seal has a cavity which is exposed to pressure in the coupling and, in response to that pressure, the seal tends to expand longitudinally to effectuate the seal between the end face of the male member and the shoulder in the female. This longitudinal expansion of the seal tends to force the male member out of the bore of the female member. To overcome the tendency for the male and female members to part, and to ensure a sealing relationship of the seal with the male and female members prior to pressurization of the coupling, an external preload mechanism is used which holds the male and female members together. The drawback to this apparatus is that if the internal pressure exceeds the holding capacity of the external preload mechanism, the male and female members will part sufficiently to break the sealing relationship with the metal seal. Also, external preload mechanisms are expensive and require considerable space for mounting in a subsea environment. The complex mechanism affords greater possibility of the problems and malfunctions.

U.S. Pat. No. 4,637,470 to Weathers et al. shows a subsea hydraulic coupling having a metal seal ring between the end face of the male member and a shoulder in the bore of the female member. The seal is V-shaped in cross-section, the lips of the V being exposed to pressure in the coupling and tending to expand longitudinally to enhance the seal between the male member and female member shoulder. The Weathers coupling includes Belleville washers which are used to preload the seal upon connection of the members, before pressurization. The preloading helps prevent leakage at low pressure. The Belleville washers exert a longitudinal force against the opposing member, in order to maintain the metal seal ring in tight contact between the members. As discussed above, the preload mechanism is expensive and complex.

The male and female portions of the above face-type couplings are each one piece devices, and the seal rests at or near the end face of the male portion. Particularly in the case of the face-type seals, there is a danger that the seal will blow out of the female section and be lost if the coupling is parted under pressure. The Weathers coupling described above discloses a retainer for holding the seal in place. The retainer is an elastomeric ring member secured within a groove formed in the bore of the female member. Even with the elastomeric ring, there is a risk that the metal seal will blow out due to pressure when disconnecting the coupling.

Another type of annular metal seal is a pressure energized annular seal which seals between the outer longitudinal surface of the male member and the bore wall of the female member. Such a seal is shown in U.S. Pat. No. 4,694,859 to Robert E. Smith III. The annular metal seal is trapped within the female body by means of an internal retainer which holds the seal against a shoulder in the female member bore. When the retainer is inserted and held in place by a clip, it preloads the metal seal by slightly compressing the seal to force it to expand radially against the male member surface. The male member is designed to be inserted through the retainer and through the metal seal so that the seal engages the circumferential surface of the male member in a sealing relationship. A cavity in the seal is exposed to internal coupling pressure to enhance the effectiveness of the seal.

Still another coupling and metal seal is shown in Applicant's pending application Ser. No. 085,982, filed Aug. 14, 1987. This coupling shows an internally preloaded metal-to-metal seal hydraulic connector, in which the sealing surface is preloaded from within the coupling itself. The seal is a metal-to-metal seal between the ground surface of the male member leading face and a mating seal seat in a sleeve member. The sleeve member is allowed to slide longitudinally in the female member bore. As the male member end face is pressed against the sleeve member, the sleeve member pushes against the bias of an internal preloading device shown as a spring washer. Before pressurization, the preloading device helps obtain a metal-to-metal seal between the leading face of the male member and the seal seat on the internal bore of the sleeve member. Upon pressurization of the coupling, the sleeve member is pressure energized to slide longitudinally against the leading face of the male member. This longitudinal movement enhances the seal. The metal-to-metal seal between the end face of the male member and the seal seat in the sleeve member is not replaceable, but requires re-machining of the mating surfaces should those surfaces become damaged.

SUMMARY OF THE INVENTION

The present invention provides for a replaceable metal-to-metal seal between the male and female coupling members with the seal being preloaded during interconnection of the male and female members. One embodiment of the present invention resides in a coupling having a female member, a sleeve member, a seal with a V-shaped cross-section, and a male member. The female member includes a longitudinal bore for slidably receiving the sleeve member. The sleeve member is allowed to slide longitudinally within the female member bore in response to internal fluid pressure, and has a longitudinal receiving bore for receiving the male member. The receiving bore in the sleeve member includes an internal shoulder on which a generally ring-shaped metal seal with a V-shaped cross-section is positioned. Upon insertion of the male member into the sleeve member, the end face of the male member contacts the lip of the V-seal. This compresses the V-seal slightly to preload the seal before pressurization of the coupling. This preloading of the V-seal prevents leakage at low pressures—until the coupling has sufficient pressure for the V-seal to be pressure energized. When the system is pressure energized, the sleeve member is urged toward the male member to keep the V-seal against the male member. The pressure causes the V-seal to expand longitudinally against the leading face of the male member and the internal shoulder of the sleeve member.

BRIEF DESCRIPTION OF THE DRAWINGS

FIG. 1 is an elevational view of a manifold incorporating couplings such as that of the present invention.

FIG. 2 is a perspective view of a coupling of the present invention showing how the coupling might be connected to the manifold of FIG. 1.

FIG. 3 is an exploded perspective view of one embodiment of the present invention with the sleeve member, the metal seal, and the female member body partially cut away.

DETAILED DESCRIPTION OF A PREFERRED EMBODIMENT

Figure 4:
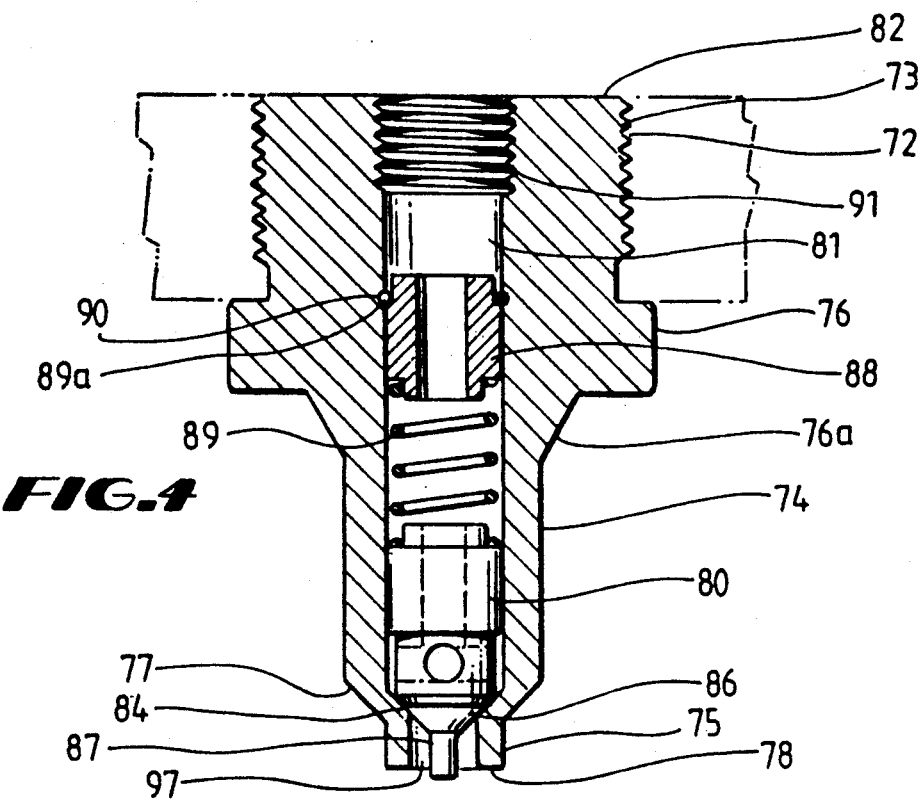
FIG. 4 is a section view of the male member before assembly of the coupling.

FIG. 1 is an elevational view of a manifold 11 which is commonly used with undersea hydraulic couplings. The couplings 12 are generally connected to opposing plates of the manifold and are held together by bolts or hydraulic members attached to the plates. As shown in FIG. 2, the male member 13 is commonly attached to one plate while the female member 14 is attached to the second plate so as to face the male member 13 and align with it. The male and female members may be attached to the manifold plates using various means, such as set screws or threads. Techniques for attaching the members to such plates are well known to those skilled in the art.

FIG. 3 is an exploded perspective view of a coupling 12 embodying the present invention. As shown, the main components of the coupling 12 include a female member 14 and a male member 13. The female member 14, and the male member 13, or probe, each include subcomponents which will be more fully described below.

As shown in FIG. 3, the female member 14 comprises several components, including a body or receiver 21, a sleeve member 22, a clip 24, and a V-shaped seal 15. Also included are annular, or axial soft seals 26 and 27.

Figure 5:
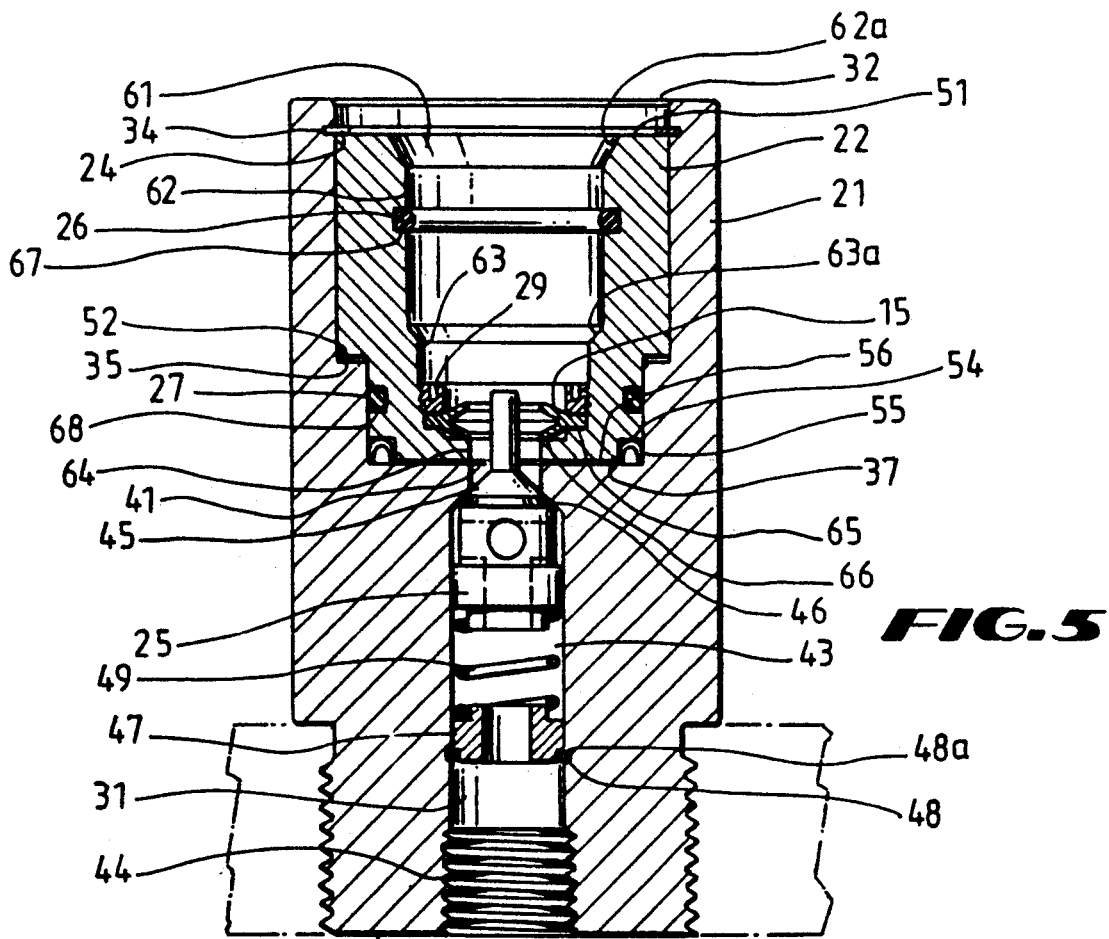
FIG. 5 is a section view of the female member before assembly of the coupling.

Now referring to FIG. 5, the main body 21 of the female member is cylindrical in shape, having a bore 31 extending along its longitudinal axis from a receiving end 32 to a terminal end 33. The bore 31 has several variations in its diameter as it extends through the body 21. The bore 31 has its greatest diameter beginning at the receiving end 32. Adjacent the receiving end 32 of the bore 31 is a clip groove 34. The groove 34 is used in conjunction with the clip 24 to retain the sleeve member 22 in the bore 31, as will be more fully explained below.

The diameter of the bore 31 is uniform from the receiving end 32 to a first shoulder 35. This first shoulder 35 is an internal circumferential shoulder, the plane of which is perpendicular to the longitudinal axis of the body 21. The first shoulder 35 and riser 36 define a stepped reduction in the diameter of the bore 31, as shown in FIG. 5. As can be seen, the riser 36 has a circular cross-section which is concentric with and smaller than the circular cross-section of the bore 31 at receiving end 32.

The reduced diameter of the bore 31 extends from the first shoulder 35 to a second internal shoulder 37. The second shoulder 37 once again defines a stepped reduction in the diameter of bore 31. As can be seen by reference to FIG. 4, this reduced diameter is also circular in shape and is centered about the longitudinal axis of the body 21. This reduced diameter extends from the second shoulder 37 to the valve seat 46. The valve seat 46 is conical in shape and effectuates an enlargement of the bore 31 as it extends from the valve port 41 towards the terminal end 33. The valve seat 46 terminates in a bore wall 43. The bore wall 43 defines a uniform diameter of the bore 31 extending from the valve seat 46 to the terminal end 33. Immediately adjacent the terminal end 33 are threads 44 for engaging a threaded incoming hydraulic line or fitting. The valve assembly 25 comprises a check valve 45, a valve spring 49, a spring collar 47, and a collar clip 48. The check valve 45 is generally conical in shape and substantially conforms to the valve seat 46. Located at the apex of the conical shape of the valve is a tip or stem 50 which is cylindrical in shape and extends along the longitudinal axis of the check valve 45 and extends through the valve port 41.

The valve spring 49 is located within the bore wall 43 with one end of the spring in contact with the base of the check valve 45. The opposite end of the spring 46 is in contact with the spring collar 47. The collar 47 is an elongated ring of circular cross-section. The outer diameter of the collar 47 is slightly less than the diameter of the bore 31 as defined by the bore wall 43, so that the collar 47 may be easily inserted therein. The collar 47 is retained within the bore 43 and is maintained in contact with the spring 49 by means of a collar clip 48 and clip grooves 48a. The clip groove 48a is located in the bore wall 43 and extends continuously about the wall 43. The clip 48 is a spring clip or snap ring which may be compressed inwardly so as to reduce its diameter for insertion into the bore 31 and therefore expand outwardly to engage the outer diameter of the groove 48a. The inner diameter of the clip 48 is less than the outer diameter of the collar 47, thus preventing the escape of the collar 47 from the bore 31.

As shown in FIG. 5, the female sleeve member 22 is essentially a sleeve with an annular shape. The outer circumference of the sleeve member 22 is stepped, having two different diameters, so as to complement the stepped bore 31 of the female body 21. Additionally, the sleeve member includes an outer groove for receiving an annular seal. As seen in FIG. 5, the outer diameter of the sleeve member 22 is greatest at its receiving end 51. The diameter is constant from the receiving end 51 of the sleeve member 22 to a first outer shoulder 52. This first shoulder 52 is a circumferential shoulder, the plane of which is perpendicular to the longitudinal axis of the seal member 22. The diameter of the sleeve member 22 again remains constant from the first shoulder 52 to outer seal groove 54. The groove 54 is for receiving an annular metal C-seal 55, as will be discussed below. The terminal end 56, also perpendicular to the longitudinal axis of the sleeve member 22, defines the final reduction in the outer diameter of the sleeve member 22.

The sleeve member 22 has a receiving bore 61 along its longitudinal axis. As can most easily be seen by reference to FIG. 5, the diameter of the bore 61 varies along its longitudinal axis and is generally defined by first, second and third bore walls 62, 63 and 64, respectively, and a seal seat 65. The receiving bore 61 has its greatest diameter at the receiving end 51 of the sleeve member 22. At the receiving end, the first bore wall 62 inclines inwardly (at 62a) to gradually reduce the diameter of the bore 61 as the bore continues away from the receiving end 51. The first bore wall 62 then defines a constant inner diameter. This constant diameter extends between the first bore wall 62 and inclined wall 63a. The inclined wall 63a slopes inwardly, further restricting the diameter of the bore. Following the inwardly inclined wall 63a, the second bore wall 63 has a constant diameter. The second bore 63 terminates in seal seat 65. The seal seat 65 is provided for positioning a generally ring-shaped seal 15. As can be seen in FIG. 4, the seal seat 65 positions the V-seal 15 longitudinally in the bore 61, so that one lip of the V-seal is adjacent internal shoulder 66. The V-seal 15 is V-shaped in cross-section and, when pressurized, one of the lips seals against the shoulder 66, while the other lip seals against the end face 78 of the male member 13. The seal seat 65 terminates in shoulder 66. The third bore wall 64 extends from shoulder 66 to the seal member terminal end 56, which lies in a plane perpendicular to the longitudinal axis of the sleeve member 22. The third bore wall 64 is dimensioned such that the tip or stem 50 of the check valve 45 is extendable therethrough.

In a preferred embodiment, a circumferential inner soft seal groove 67 is located about the inner diameter of the sleeve member 22 near the receiving end 51. An outer circumferential seal groove 68 is located in the outer diameter near the terminal end 56 of the sleeve member 22. The circumferential seal grooves receive annular, or axial, soft seals 26 and 27 for sealing between the receiving bore 61 and the outer circumference of the male member 13, and for sealing between the outer circumference of the seal member and the female member bore 31, respectively. The annular soft seals 26 and 27 are of a relatively pliable material, for example, rubber or synthetic elastomer. The annular soft seals are of greater thickness than the respective depths of the grooves 67 and 68. As a result, the seals 26 and 27, when properly positioned in the respective grooves, protrude slightly therefrom.

Located in the female member bore 31 adjacent the receiving end 32 of the female member body 21 is a clip groove 34. This groove is used in conjunction with clip 24 to retain the sleeve member 22 within the bore 31 of the female member. The clip 24 is preferably a spring clip, or snap ring, having an outside diameter greater than the diameter of the clip groove 34. The inside diameter of the clip 24 is less than the diameter of the bore 31 and is also less than the outside diameter of the sleeve member 22. When the clip 22 is positioned in the groove 34 it exerts an outward expanding force against the groove 34 so as to be held in the groove.

Figure 6:
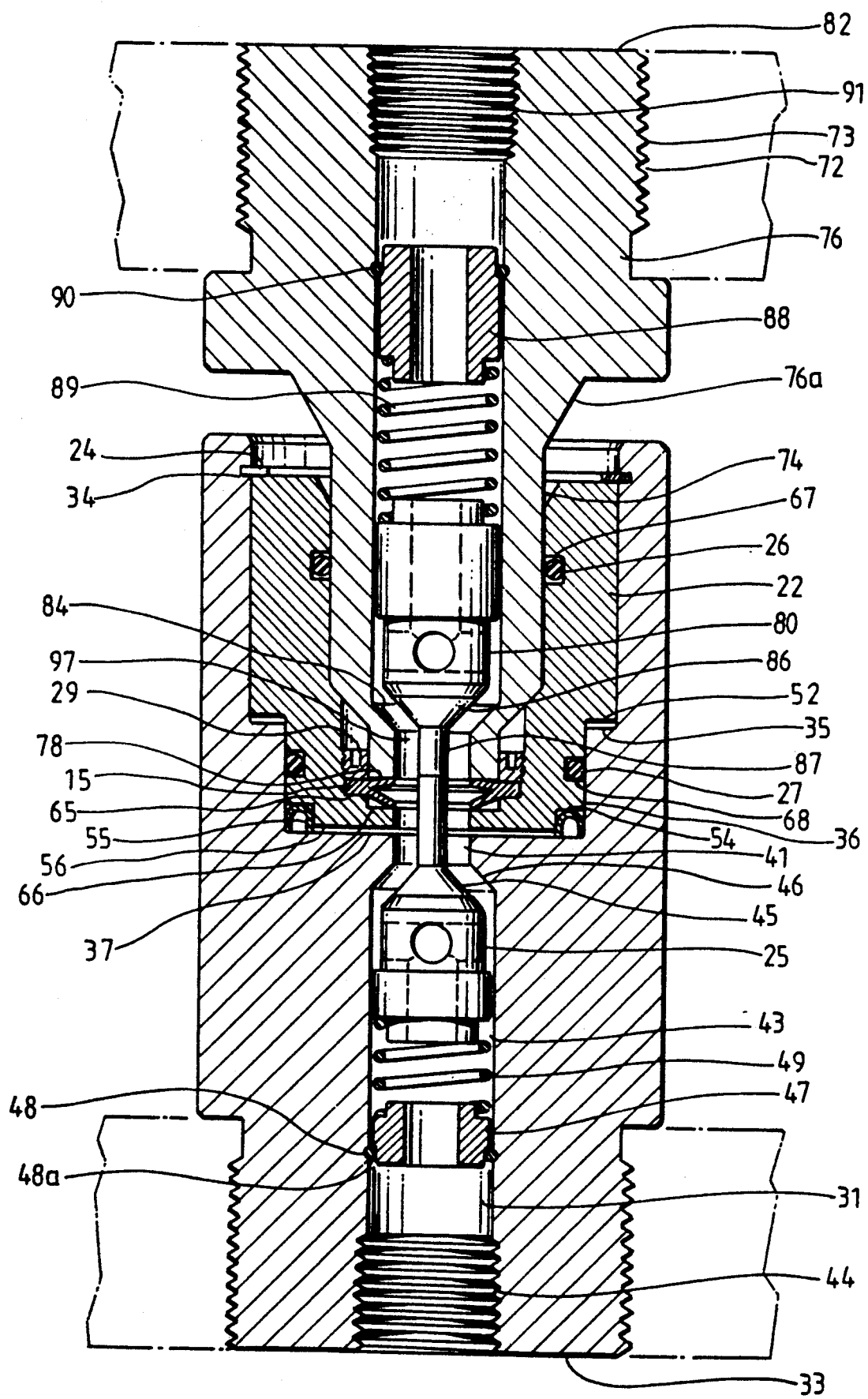
FIG. 6 is a section view of the assembled coupling.

Still referring to FIG. 5, an annular metal V-seal 15, generally ring-shaped when viewed from its end and generally V-shaped in cross-section, is positioned on the seal seat 65 in the receiving bore 61 of the sleeve member. The V-seal 15 is of a type having two lips that face inwardly, defining a generally V-shape. When the male member 13 is inserted into the bore 61 of the sleeve member, the lips of the seal ring deflect inwardly, or are compressed slightly. When the seal is pressure energized, as shown in FIG. 6, the pressure in the cavity between the lips causes the lips to expand outwardly a slight amount, but not to permanently deform. This expansion of the seal provides the necessary sealing between the end face 78 of the male member and the internal shoulder 66 of the sleeve member. In other words, the V-shaped seal expands longitudinally against the respective sealing surfaces when the seal is pressure-energized. The V-seal 15 preferably is a metallic, elastic member, capable of regaining its original shape following longitudinal compression or expansion. The V-seal 15 is retained on the seal seat 65 with a nut 29 or retaining clip. The nut may be threaded onto mating threads 30 in the internal bore 61 of sleeve member 22. Alternatively, the clip may be secured with a clip groove in the internal bore (not shown).

The overall length of the sleeve member 22 is less than the length of the female bore 31 between the clip 24 and the shoulder 37. The sleeve member 22 can float between a first, extended position (shown in FIG. 6) in contact with the clip 24 and a second, compressed position against the shoulder 37. This fully compressed position is illustrated in FIG. 5. At each of these extreme positions and at any position therebetween, the metal C-seal 55 retains its position with respect to the seal member outer wall or riser 36. Thus, as the sleeve member 22 slides within the female bore 31, the point at which the C-seal 55 engages the female bore wall also moves longitudinally. Fluid pressure acting on the cavity of the C-seal maintains the seal between the sleeve member and female bore wall.

The male member 13, as shown in FIG. 4, comprises generally three cylindrical shapes. A probe handle 72 is a cylinder of substantially uniform outside diameter. Threads 73 may be added to the external surface to facilitate attachment to a coupling manifold, as explained above, or the external surface may be machined smooth and the probe 13 may be attached to the manifold by means of set screws (not shown). The probe handle 72 and probe wall 74 lie along the same longitudinal axis and are connected by a first shoulder 76. The first shoulder 76 includes a truncated, conical section 76a, the larger diameter facing the handle 72, and the smaller diameter being coincident with the end of probe wall 74.

The probe head 75 is a generally cylindrical member lying along an extension of the longitudinal axis of the probe wall 74. The probe head 75 is connected to the wall 74 by means of second, truncated conical shoulder 77. Second shoulder 77 is a truncated cone section having its larger diameter face coincident with the end of the probe wall 74, and having its smaller diameter face coincident with an end of the probe head 75. The probe head 75 terminates in a leading end face 78. The leading end face 78 is adapted for engagement with the metal V-seal 15 in the receiving bore 61 of the sleeve member when the male member 13 is inserted therethrough. When the male member 13 is fully inserted into the receiving bore 61 of the sleeve member 22 into contact with V-seal 15, the lips of the seal 15 are compressed slightly to preload the V-seal. This compression of the V-seal is controlled by the length of the male member in relation to the shoulder 77 of the male member, the position of inclined wall 63a and shoulder 66 of the female member, and also by the position of the V-seal 15 in the female in relation to internal shoulder 66. Preloading of the V-seal 15 prevents leakage at low pressures, or until the V-seal has sufficient pressure on it to be pressure energized.

Again referring to FIG. 4, passageway or bore 81 has a circular cross-section, is centered on the longitudinal axis of the male member 13, and extends from a terminal end 82 to the male member leading face 78. Near the leading face 78, the bore 81 slopes inwardly to form a valve seat 84 for male poppet valve assembly 80. Adjacent the male member leading face 78, the bore wall has a smaller internal diameter and again parallels the longitudinal axis of the probe 13. The outer probe wall 74 also includes inclined surface (second shoulder 77) which corresponds with the mating inclined surface 63a of the sleeve member. The male member further includes valve port 97, which is of substantially the same diameter as the valve port 41 in the female member body 21.

As in the female member, the male member valve assembly 80 includes a check valve 86, a valve stem 87, a valve spring 89, a spring collar 88, and a collar clip 90. The structure of this valve assembly 80 is substantially the same as the structure of the corresponding valve assembly 25 in the female member. A clip groove 89a is located in the bore wall 81 near the terminal end 82 of the probe. The clip groove 89a retains a collar clip 90 which, in turn, retains a spring collar 88 within the bore 81. Also located in the bore 81 adjacent the terminal end 82 of the male member 13 are threads 91 for receiving a threaded incoming tubular member or fitting (not shown).

The operation of the coupling according to the present invention first involves insertion of the male member into the female member to slightly compress the V-seal longitudinally. This is preloading of the V-seal. The insertion of the male member into the female member slightly compresses the V-seal 15 and presses against the sleeve member 22, forcing the sleeve member to slide into the compressed position in the female member bore 31.

The tip of male member valve stem 87 then contacts the tip of female member valve stem 50 and continued insertion of the male member into the bore 31 causes the valves 45 and 86 to mutually exert opening forces. The insertion of the male member 13 into the female member bore may be limited by the relative positions of the shoulders of the sleeve member, the female bore, and the male member, as well as by the desired compression upon preloading of the V-seal.

When the valves 45 and 86 open, the bores 81 and 31 are exposed to pressure in the connected lines and, in response to that pressure, the sleeve member 22 is urged toward the male member. As the internal line pressure increases within the system, the sealing pressure between the leading face 78 of the male member and the shoulder 66 in the sleeve member is increased. The increased pressure tends to urge the lips of the V-seal to expand longitudinally, while the sleeve member is urged into the extended position, as shown in FIG. 6. The sleeve member slides within the female bore to ensure that the seal is maintained even when there are tolerances and/or slight differences in longitudinal dimensions between each of the ten or more mating coupling members on each opposing manifold plate. To compensate for connector manifold plate tolerances and/or slight separation of manifold plates 11 due to deflection when the couplings are pressurized, pressure within the coupling urges the sleeve member 22 to slide toward the male member leading face 78. The pressure exerts a longitudinal force on the sleeve member 22 by acting on the cavity of the metal C-seal 55 and acting on the elastomeric backup seal. Thus, internal pressure is used to urge the sleeve member 22 toward the extended position and keep the V-seal 15 in sealing contact against male member leading face 78. The movement of the sleeve member 22 is limited by retainer clip 24, in the female member bore.

As shown, the present invention eliminates the need for any external preload devices or spring washers for preloading. Instead, the V-seal is slightly compressed before pressurizing, then line pressure is used to urge the sleeve member 22 against the male member leading face and thereby enhance the seal. The V-seal is replaceable and is securely held by a threaded nut or retaining clip 29 in the sleeve member.

It will now be understood by those of skill in the art that an improved connector may be made utilizing the present invention. Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling having a central axis, comprising:

a female member having a first bore therethrough, the first bore having a first circumferential shoulder therein;

a sleeve-like member for sliding insertion into the first bore and being positionable on the first circumferential shoulder, the sleeve-like member having a second bore therethrough, the second bore having a wall and a second circumferential shoulder therein;

a male member having a leading face, the male member adapted for sealing insertion into the sleeve-like member; and a first generally ring-shaped metal seal positionable in the second bore between the male member leading face and the second circumferential shoulder, the first metal seal adapted to expand longitudinally in response to fluid pressure in the coupling to form a fluid seal between the second circumferential shoulder and the male member leading face; and wherein the sleeve-like member is adapted to slide away from the first shoulder and toward the leading face of the male member to enhance the fluid seal in response to fluid pressure in the coupling, the sleeve-like member having a groove about its outer circumference and a second generally ring-shaped metal seal positionable in the groove.

2. The undersea hydraulic coupling of claim 1, wherein the first metal seal is generally V-shaped in cross-section, and wherein the closed end of the V-shaped cross-section faces the wall of the second bore and the open end of the V-shaped cross-section faces the central axis of the coupling.

3. The undersea hydraulic coupling of claim 1, further comprising retention means adapted to hold the first metal seal in the second bore adjacent the second circumferential shoulder.

4. The undersea hydraulic coupling of claim 1, further comprising retention means adapted to hold the sleeve-like member in the first bore of the female member.

5. The undersea hydraulic coupling of claim 1, wherein the second metal seal is responsive to pressure in the coupling to form a fluid seal between the first bore and the sleeve-like member.

6. A coupling comprising:

a female member having a longitudinal bore extending therethrough and a first internal shoulder intermediate the bore;

a sleeve member insertable into and sealingly engageable with the longitudinal bore, the sleeve member having a central bore and a second internal shoulder adjacent one end of the central bore, the sleeve member being responsive to internal pressure in the coupling tending to urge the sleeve member to slide longitudinally away from the first internal shoulder, the sleeve member having a groove about its outer circumference and a first generally ring-shaped metal seal positionable in the groove;

a second generally ring-shaped metal seal having a V-shaped cross-section, the second metal seal being repeatably positionable in the central bore adjacent the second internal shoulder, the second seal being responsive to internal pressure in the coupling tending to urge the V-seal to expand longitudinally;

a male member insertable into the central bore of the sleeve member and having a leading face sealingly engageable with the second metal seal; and retaining means adapted to retain the second metal seal in the central bore of the sleeve member.

7. The coupling of claim 6, wherein the leading face of the male member is adapted to compress the second metal seal for preloading the metal seal upon insertion of the male member into the central bore of the sleeve member before pressurization of the coupling.

8. The coupling of claim 6 further comprising a third internal shoulder intermediate the central bore of the sleeve member, the third internal shoulder adapted to limit the insertion of the male member into the central bore of the sleeve member.

9. The coupling of claim 6 further comprising second retaining means adapted to retain the sleeve member in the longitudinal bore of the female member.

* * * * *